United States Patent
Haendeler et al.

(10) Patent No.: US 6,441,108 B1
(45) Date of Patent: Aug. 27, 2002

(54) GAS-PHASE POLYMERIZATION IN A BELL-SHAPED REACTOR

(75) Inventors: Friedrich Haendeler, Bergisch Gladbach; Heiko Herold, Neuss; Leslaw Mleczko, Bochum; Claus Riehle, Odenthal; Franz-Josef Mersmann, Bergisch Gladbach; Jürgen Schneider, Köln; Michael Dauben, Neuss, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/529,069
(22) PCT Filed: Sep. 26, 1998
(86) PCT No.: PCT/EP98/06125
§ 371 (c)(1),
(2), (4) Date: Apr. 6, 2000
(87) PCT Pub. No.: WO99/19059
PCT Pub. Date: Apr. 22, 1999

(30) Foreign Application Priority Data

Oct. 10, 1997 (DE) .......................................... 197 44 710

(51) Int. Cl.[7] ................ C08F 2/34; B01J 8/24
(52) U.S. Cl. .................... 526/64; 526/67; 526/88; 526/901; 526/918; 524/855; 422/132; 422/139; 422/140
(58) Field of Search ................. 422/132, 139, 422/140; 526/64, 901, 918, 88, 67; 524/855

(56) References Cited

U.S. PATENT DOCUMENTS

| | | | |
|---|---|---|---|
| 4,003,712 A | 1/1977 | Miller | 23/288 S |
| 4,469,855 A | * 9/1984 | Cooper | 526/901 X |
| 4,882,400 A | 11/1989 | Dumain et al. | 301/88 |
| 4,994,534 A | * 2/1991 | Rhee et al. | 526/88 |
| 5,306,792 A | 4/1994 | Havas et al. | 475/106 |
| 5,428,118 A | 6/1995 | Painter et al. | 526/74 |
| 5,453,471 A | 9/1995 | Bernier et al. | 526/68 |
| 5,688,910 A | 11/1997 | Wang | 765/483 |
| 5,796,071 A | 8/1998 | Morin et al. | 728/203 |
| 5,912,309 A | * 6/1999 | Lee et al. | 526/901 X |

FOREIGN PATENT DOCUMENTS

EP 0 059 080 * 9/1982

OTHER PUBLICATIONS

Chem. Eng. Sci., vol. 49, pp. 4579–4588, (month unavailable), 1994, "New Reactor in Jet Spouted Bed Regime for Catalytic Polymerization".

Ullmanns Encyklopadie der technischen Chemie, 4th Ed, (date unavailable) 1980, vol. 19, pp. 186–226, "Polyolefine".

* cited by examiner

Primary Examiner—Fred Teskin
(74) Attorney, Agent, or Firm—Joseph C. Gil; Noland J. Cheung; Jennifer R. Seng

(57) ABSTRACT

The present invention relates to a process for the continuous discharge of pre-classified polymer particles, particularly rubber particles, from a gas phase polymerization reactor, comprising the steps of classifying the polymer in a classifier, discharging the particles with a sufficient size and conveying the undersized particles back into the gas phase polymerization reactor.

16 Claims, 2 Drawing Sheets

GAS-PHASE POLYMERIZATION IN A BELL-SHAPED REACTOR

FIELD OF THE INVENTION

The invention relates to a fluidised-bed reactor for the production especially of rubber in the gas phase, the wall of which reactor is in the form of a cylinder in its lower portion and, adjacent thereto, is in the form of a continuously opening cone, the cone angle realtive to the centre line being from 2 to 10° C. and the fluidized bed being higher than the cylindrical portion.

BACKGROUND OF THE INVENTION

The polymerization of polyolefins in the gas phase is a process which has long been known and was first carried out on an industrial scale as early as 1968 (Ullmanns Encyklopädie der technischen Chemie, 4th edition 1980, Vol. 19, p. 186 ff).

In that process, the actual polymerisation reaction takes place in a fluidised-bed reactor which consists of a reaction zone and, located above it, a calming zone in which the solids particles are largely separated from the gas phase. The monomers, the catalyst and possible additives, such as, for example, additives or fillers, are introduced into the reaction zone. In order to maintain a fluidised bed, a circulating gas stream is fed to the reactor from below. The circulating gas stream, which consists essentially of the unreacted monomers, is removed again at the top of the reactor, freed of residual particles, cooled and fed back into the reactor. The resulting polymer is removed from the reaction zone continuously or semi-continuously and treated further.

In the construction of apparatuses for use in the gas-phase polymerisation process, particular attention must be paid especially to tacky reaction products, in order to avoid agglutinations and caking on the reactor wall or other parts of the reactor (reactor fouling) and to avoid agglomerations of product.

That is the case especially with a fluidised-bed reactor. Accordingly, many publications deal with the construction thereof.

U.S. Pat. No. 4,003,712, for example, discloses a vertical fluidised-bed reactor which has a cylindrical lower portion followed by a short conical section and a further cylinder having a larger cross-section than the lower portion. The actual polymerisation reaction takes place in the lower portion, while in the upper portion, the calming zone, the polymer particles are separated from the stream of gas.

A large number of other publications are based on the geometry of the reactor. There are mentioned here by way of example only the following: WO 96/04322, EP-A-0 301 872, EP-B-0 475 603 and EP-A-0 728 771. The above-mentioned reactor has the disadvantage that polymer particles cake in the transition region between the lower portion and the upper portion and thus narrow the reactor cross-section continuously until the reactor must be shut down and cleaned. A common feature of all the processes is that the fluidised bed is always located in the cylindrical portion of the reactor and that sharp edges occur between the cylindrical portion and the conical sectior of the reactor. EP-A-0 765 886 discloses an apparatus for the degassing of olefin polymers, the walls of which extend at an angle of from 0.5 to 15° C., measured with respect to the centre line.

In order to avoid so-called reactor fouling, U.S. Pat. No. 5,428,118 proposes passing a tangential stream of air over the walls of the calming zone so that deposits are avoided or deposited particles are whirled up again. Even with that teaching, the operating time of the fluidised-bed reactor in the case of rubbers can be lengthened only insignificantly.

In the publication "New Reactor in Jet Spouted Bed Regime For Catalytic Polymerization" Chem. Eng. Sci. Vol. 49, pages 4579–4588 there is further described a jet spouted bed reactor for gas-phase polymerisation which widens conically by an angle of from 10 to approximately 23° C. immediately above the gas inlet. That reactor is said to be suitable for the handling of tacky polymer particles, the authors starting not from a fluidised-bed process but from a jet spouted bed process with plug flow. The process has not been tested on an industrial scale.

The object is, therefore, to make available a fluidised-bed reactor which does not have the disadvantages of the prior art.

According to the invention, the object is achieved by providing a fluidised-bed reactor for the production of, especially, rubbers in the gas phase, which reactor has a circular cross-section and the wall of which is in the form of a cylinder in its lower portion and, adjacent thereto, is in the form of a continuously opening cone, similar to a bell.

The fluidised bed in the reactor according to the invention extends at least over the entire length of the cylindrical portion. The fluidised bed preferably also extends into the cone, whereby the overall height of the fluidised bed should preferably not exceed 150%, especially 130%, of the length of the cylindrical portion.

The volume of the cylindrical portion is determined according to the average dwell time of the polymer particles in the fluidised bed, the height of the cylindrical portion being such that a rising, continually growing bubble fulls not more than 80% of the cross-section of the cylindrical portion. The diameter of the cylindrical portion is calculated from the volume and the height thereof.

The nominal linear velocity of the gas in the cylindrical portion must correspond at least to the rate of loosening of the polymer particles. However, the nominal linear gas velocity is preferably at least 3 times, especially from 5 to 7 times, the rate of loosening. The nominal linear gas velocity is preferably to be from 0.3 to 2 m/s, especially from 0.4 to 1 m/s, very especially from 0.5 to 0.8 m/s.

The cone angle, relative to the centre line, is preferably from 2 to 10° C., especially from 3 to 6° C. and very especailly from 3.5 to 5.5° C.

The length of the cone is such that the cross-section of the reactor at the end of the cone is so great, and the nominal linear gas velocity is thus so low, that catalyst or polymer particles having a size of from 10 to 1500 $\mu$m, preferably from 50 to 300 $\mu$m, especially from 50 to 150 $\mu$m, are no longer discharged from the reactor. By that measure, the discharge of solids from the reactor according to the invention is reduced and gumming up of the apparatuses located downstream is reduced.

The ratio of the diameter of the cylinder to the height of the reactor is preferably 1:8–15, especially 1:11–12.

The ratio of the height of the cylinder to the height of the cone is preferably 1:1.5–4, especially 1:2–2.5.

In a further preferred embodiment, the ratio of the height of the cylinder to the height of the cone is 1:80–100, so that virtually the entire casing of the reactor is in the form of a continuously opening cone.

The reactor is preferably closed off at the top by means of a hemisphere. The hemishpere may have baffles. A tangential stream of air preferably acts on the sphere, so that the hemishpere functions as a cyclone built into the reactor. The base of the reactor may be of any desired form, the form of a hemisphere being preferred.

The gas mixture to be polymerised is preferably introduced into the reactor at the lower end through a perforated gas distributor. The gas distributor must be so designed that good solids mixing prevails in the fluidised bed and gas passes over the walls of the cylindrical portion continuously in order to avoid polymer particles being deposited thereon. A perforated base is preferably used.

If necessary, a tangential stream of gas may also act upon the walls of the cone, so that no polymer deposits form.

The reactor is preferably operated at a temperature of from 20 to 160° C. and a pressure of from 1 to 20 bar absolute. In the process according to the invention, the temperature may also be so selected that it is below the dew point of at least one constituent of the circulating gas.

The reaction is preferably manufactured from stainless steel or black steel.

The fluidised-bed reactor according to the invention is suitable for the production of polymers of any kind, preferably for the production of rubbers of any kind in the gas phase.

Within the scope of the invention, polymers are, for example, poly-α-olefins, polyisoprene, polystyrene, styrene-butadiene rubber (SBR), isobutylene-isopropylene rubber (IIR), polyisobutene, polychloroprene, silicones and copolymers of ethylene and one or more of the following compounds: acrylonitrile, malonic acid ester, vinyl acetate, acrylic and methacrylic acid esters, α-olefins, dienes and trienes.

Rubbers within the scope of the invention are uncrosslinked but crosslinkable polymers which can be converted into the rubber-elastic state by the crosslinking.

Preferably, however, the fluidized-bed reactor according to the invention is used for the production of ethylene-propylene copolymers (EPM), ethylene-propylene-diene terpolymers (EPDM), SBR, nitrile-butadiene rubber (NBR), polyisoprene and butyl rubber (BR) in the gas phase.

The polymers may contain the conventional additives. In the process according to the invention, the polymers may also be produced in the presence of inert fillers. Preferred fillers are carbon black, silica, clay, talcum and/or ground polyolefin.

The rubbers produced in the gas phase are suitable for the production of moulded bodies of any kind. Preferably, however, the rubbers are used for the production of motor vehicle tires.

The rubbers produced in the fluidised-bed reactor according to the invention are also preferably used in admixture with other plastics for the modification thereof.

It must be regarded as completely surprising and unexpected to the person skilled in the art that, with the reactor according to the invention, the operating times can be increased by a factor of 10 as compared with reactors of the prior art. Because the fluidsed bed extends into the cone, particles constantly flow around the transition between the cone and the cylindrical portion of the reactor, so that no deposits form especially in that sensitive area.

The invention is explained hereinbelow with reference to FIGS. 1 and 2 by way of examples.

Figure 1:
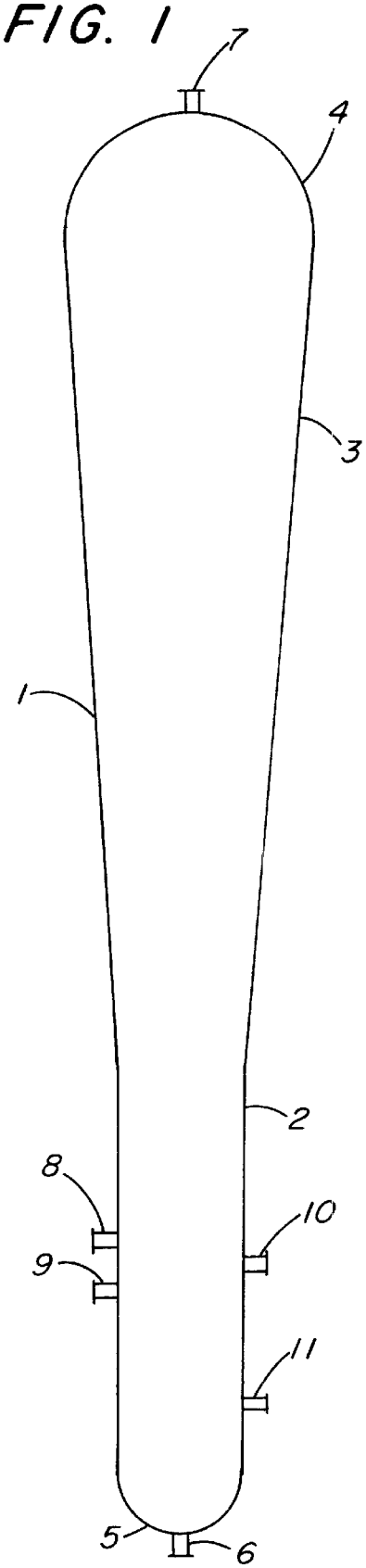
FIG. 1 shows a diagrammatic sketch of the fluidised-bed reactor according to the invention.

FIG. 1 shows the reactor according to the invention. The casing 1 of the vertical reactor consists of a cylinder 2 and a continuously opening cone 3. The diameter of the cylinder is 0.9 m and its height is 3.1 m. The cone 3 sits on the cylinder 2 and has a height of 6.5 m. Accordingly, the ratio of th ediameter of cylinder 2 to the height of the reactor is 10.6. The ratio of the height of the cylinder to the height of the cone is 1:2.1. A hemisphere 4 is located on the cone and closes off the reactor at the top. A hemishpere 5 likewise forms the base of the reactor.

The reactor also has a gas-distribution base (not shown).

The reactor has a flange 6 in the base 5 as a gas inlet and a flange 7 in the hemisphere 4 as a gas outlet. Fillers and one or more catalysts in supported or unsupported form and other additives, likewise in supported or unsupported form, are introduced into the fluidised-bed reactor according to the invention through the flanges 8 to 10. The polymerised product is expelled via the flange 11.

Figure 2:
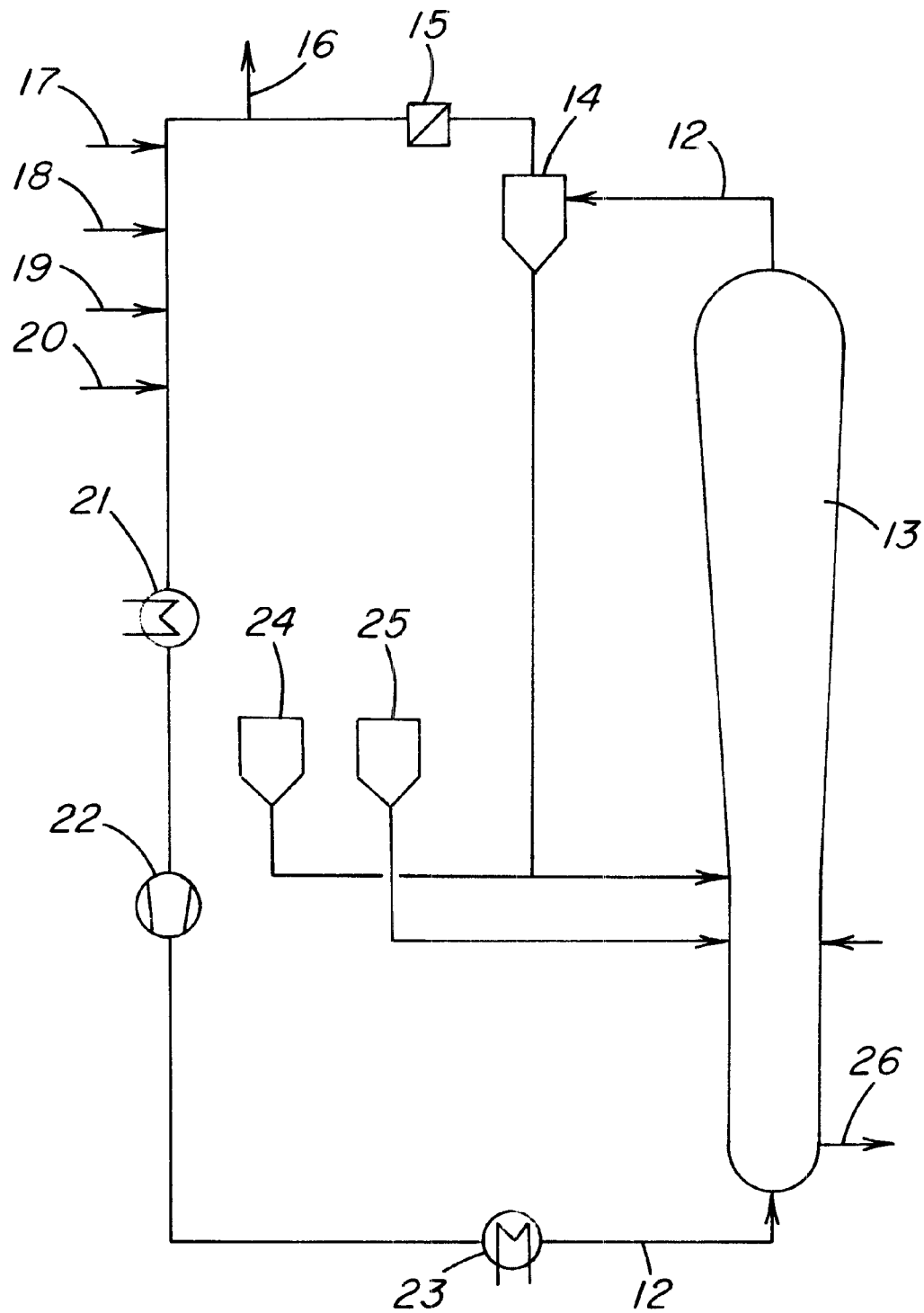
FIG. 2 shows the integration of the fluidised-bed reactor according to the invention into the polymerisation process.

FIG. 2 shows the integration of the fluidised-bed reactor according to the invention into the polymerisation process. A circulating gas mixture 12 consisting of 1,3-butadiene, optionally additives and nitrogen as inert gas is introduced from below into the fluidised-bed reactor 13 according to the invention, in which the 1,3-butadiene polymerises to polybutadiene. The polymerisation takes place at a temperature of 80° C. and a pressure of 4 bar.

The circulating gas mixture 12 depleted of 1,3-butadiene leaves the fluidised-bed reactor at the top and is freed in a filter 14 of particles which have been carried out of the reactor with it. A portion of the circulating gas mixture 12 can be discharged as waste air via the outlet 15 before monomer, regulator, nitrogen and other additives are added to the circulating gas mixture via the inlets 16 to 19. The circulating gas mixture is then cooled by means of a heat exchanger 20, compressed to process pressure by the compressor 21 and again cooled in the heat exchanger 22 before being passed into the fluidised-bed reactor according to the invention again.

Fillers and catalyst(s) are metered into the fluidised-bed reactor from the storage containers 23 and 24, respectively. The finished product is removed via the outlet 25.

EXAMPLES

The Examples which follow serve to explain the Invention.

Preliminary note:

The various reactors were integrated into the polymerisation process according to FIG. 2. A perforated base analogous to EP-A-260 154 was used as the gas distributor.

For the EPM tests, the catalyst used was a Ziegler system supported on silica and based on vanadium ($VOCl_3$) with triethylaluminium as co-catalyst. The average particle size of the support was from 150 to 200 $\mu$m; chloroform was used as the reactivator.

For the BR tests, the neodymium-based catalyst with diisobutylaluminium hydride described in EP-B-647 657 was used as the catalyst. The average particle size of the support was from 150 to 200 $\mu$m.

After the reactor had been closed, the installation was rendered inert by repeated flusing with nitrogen. An inert starting bed was then introduced and co-catalyst was metered in until the oxygen and water content in the installation fell below 3 ppm.

Test 1

A conventional reactor according to EP-A-301 872 was used. The gas distributor was followed by a vertical cylinder having a diameter of 169 mm and a length of 1 m, which in turn was followed by a conventional retardation zone having a height of 43 cm and an aperature of 12° C. The height of the fluidised bed was kept constant at 60 cm above the gas distributor by the continuous removal of product, and the nominal linear velocity in the cylinder was adjusted to 0.6 m/s. With the aid of the described V catalyst, a production rate of 2 kg of product (EPM) per hour was set; deviations were compensated by increasing or reducing the amount of catalyst metered in. The reaction temperature was 70° C. The composition of the product was adjusted to an ethylene:propylene ratio of 70:30 by means of the monomer composition in the gas phase: the partial pressures were 7 bar ethylene, 3 bar propylene, 3 bar nitrogen. The reactor was shut down after 10 hours; fur-like deposits were found on the walls and at the transition from the cylinder to the retardation zone.

Test 2

The procedure was analogous to Test 1. However, an Nd-based catalyst according to EP-A-647 657 was used. The reaction temperature was again 70° C.; 1,3-butadiene in gaseous form was metered in as the monomer; the monomer partial pressure was 4 bar, the nitrogen partial pressure was 3 bar. A production rate of 2 kg of BR/h was again set by means of the amount of catalyst.

The reactor was shut down after 5 hours; thick fur-like deposits were found on the walls, especially at the transition from the cylinder to the retardation zone.

Test 3

A reactor according to the invention was used. The gas distributor was followed by a vertical cylinder having a diameter of 219.5 mm and a length of 40 cm, which was followed by a bell-shaped retardation zone having an initial diameter of 217.5 mm and a widening angle of 4° C. and a height of 1.14 m. The reactor was closed off at the top and bottom by a hemisphere. The height of the fluidised bed was kept constant at 60 cm above the gas distributor by the continuous removal of product. The nominal linear velocity in the cylindrical portion was adjusted to 0.6 m/s. With the aid of the described V catalyst, a production rate of 2 kg of product (EPM) per hour was set; devations were compensated by increasing or reducing the amount of catalyst metered in. The reaction temperature was 70° C. The composition of the product was adjusted to an ethylene:propylene ratio of 70:30 by means of the monomer composition in the gas phase; the partial pressures were analogous to Example 1. The reactor was stopped after 10 hours; no coatings were found on the walls or at the transition from the cylinder to the retardation zone.

Test 4

The procedure was analogous to Test 3. However, an Nd-based catalyst according to EP-B-647 657 was used. The reaction temperature was again 70° C.; the monomer metered in in this case was 1,3-butadiene in gaseous form; the monomer and nitrogen partial pressures were analogous to Example 2. A production rate of 2 kg of BR per hour was again set by means of the amount of catalyst added.

The reactor was stopped after 5 hours; no coatings or deposits were found on the walls or at the transition from the cylinder to the retardation zone.

What is claimed is:

1. Fluidized-bed reactor comprising a circular cross-section for the production of tacky polymers in the gas phase, wherein the wall of the fluidized-bed reactor is in the form of a cylinder in its lower portion and, adjacent thereto, is in the form of a continuously opening cone, the angle of the cone, relative to the center line, is from 2 to 10° C., and wherein the ratio of the height of the cylinder to the height of the cone ranges from 1:1.5 to 1:4.

2. Fluidised-bed reactor according to claim 1, characterised in that the ratio of the diameter of the cylinder to the overall height of the reactor is 1:8–15, preferably 1:10–12.

3. Fluidized-bed reactor according to claim 1, wherein the wall of the reactor, adjacent to the continuously opening cone, is in the form of a hemisphere.

4. Fluidised-bed reactor according to any one of claims 1 to 3, characterized in that the reactor is provided with a perforated base as the initial-flow base.

5. A fluidized-bed reactor according to claim 1, wherein said angle ranges from 3 to 6° C.

6. A fluidized-bed reactor according to claim 5, wherein said angle ranges from 3.5 to 5.5° C.

7. A fluidized-bed reactor according to claim 1, wherein said height of the cylinder to the height of the cone is 1:1.8 to 1:2.4.

8. A fluidized-bed reactor according to claim 2, wherein the ratio of the diameter of the cylinder to the overall height of the reactor is 1:10 to 1:12.

9. A method of carrying out gas-phase polymerization reactions in a fluidized-bed reactor, wherein said reactor comprises a circular cross-section, wherein the wall of the fluidized-bed reactor is in the form of a cylinder in its lower portion and, adjacent thereto, is in the form of a continuously opening cone, the angle of the cone, relative to the center line, is from 2 to 10° C., and wherein the fluidized bed is higher than the cylinder.

10. A method according to claim 9, wherein the polymerization is carried out in the presence of fluidized catalyst particles, wherein the height of the cone is such that the velocity of the gas at the upper end of the cone is lower than the rate of fall of the growing catalyst particle.

11. Method according to any one of claims 9 to 10, characterised in that the ratio of the diameter of the cylinder (2) to its height is so adjusted that the diameter is greater than 70% of the maximum bubble diameter in the bed.

12. Method according to any one of claims 9 to 10, characterised in that the nominal linear velocity of the gas in the cylindrical portion is from 0.3 to 2 m/s.

13. Method according to any one of claims 9 to 10, characterised in that the polymerisation is carried out in the presence of an inert filler.

14. Method according to claim 13, characterised in that the inert filler is carbon black, silica, clay, talcum and/or ground polyolefin.

15. A method according to claim 9, wherein the fluidized bed is maintained by a circulating gas stream, wherein the polymerization is carried out at temperatures below the dew point of one of the circulating gas constituents employed.

16. A method according to claim 12, wherein said nominal linear velocity of the gas in the cylindrical portion is from 0.4 to 1 m/s.

* * * * *